(12) United States Patent
Bakx

(10) Patent No.: US 8,000,176 B2
(45) Date of Patent: Aug. 16, 2011

(54) ESTIMATION OF MAXIMUM AVAILABLE WRITE POWER OF AN OPTICAL STORAGE DRIVE

(75) Inventor: Johannes Leopoldus Bakx, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 542 days.

(21) Appl. No.: 11/994,539

(22) PCT Filed: Jul. 6, 2006

(86) PCT No.: PCT/IB2006/052280
§ 371 (c)(1),
(2), (4) Date: Jan. 3, 2008

(87) PCT Pub. No.: WO2007/007246
PCT Pub. Date: Jan. 18, 2007

(65) Prior Publication Data
US 2008/0165635 A1 Jul. 10, 2008

(30) Foreign Application Priority Data
Jul. 7, 2005 (EP) .................. 05106183

(51) Int. Cl.
*G11B 11/00* (2006.01)
(52) U.S. Cl. .................................... 369/13.26
(58) Field of Classification Search .............. None
See application file for complete search history.

(56) References Cited

U.S. PATENT DOCUMENTS

| 5,029,155 | A | 7/1991 | Kenjo |
| 5,185,734 | A * | 2/1993 | Call et al. ............ 369/116 |
| 5,392,273 | A | 2/1995 | Masaki et al. |
| 5,446,716 | A | 8/1995 | Eastman et al. |
| 7,006,419 | B2 * | 2/2006 | Yokoi ............ 369/59.11 |
| 7,221,644 | B2 * | 5/2007 | Kobayashi et al. ........ 369/275.5 |
| 7,276,815 | B2 * | 10/2007 | Algrain et al. ............ 307/80 |
| 2003/0002409 | A1 | 1/2003 | Morishima |
| 2004/0052179 | A1 | 3/2004 | Ishiyama |
| 2004/0233826 | A1 | 11/2004 | Sugano |

FOREIGN PATENT DOCUMENTS

| EP | 0364213 | 4/1990 |
| JP | 2002-324316 | 11/2002 |
| JP | 2003281726 A | 10/2003 |
| JP | 2003-317247 | 11/2003 |

OTHER PUBLICATIONS

ISR/Written Opinion of the International Searching Authority PCT_IB2006052280.

* cited by examiner

*Primary Examiner* — Joseph H Feild
*Assistant Examiner* — Parul Gupta

(57) ABSTRACT

A method for estimating maximum available write power of an optical storage drive includes generating a beam of laser light having a power level, measuring a first parameter of the laser light source and a second parameter of the beam of laser light, and using the measured parameters to estimate the maximum available write power.

26 Claims, 10 Drawing Sheets

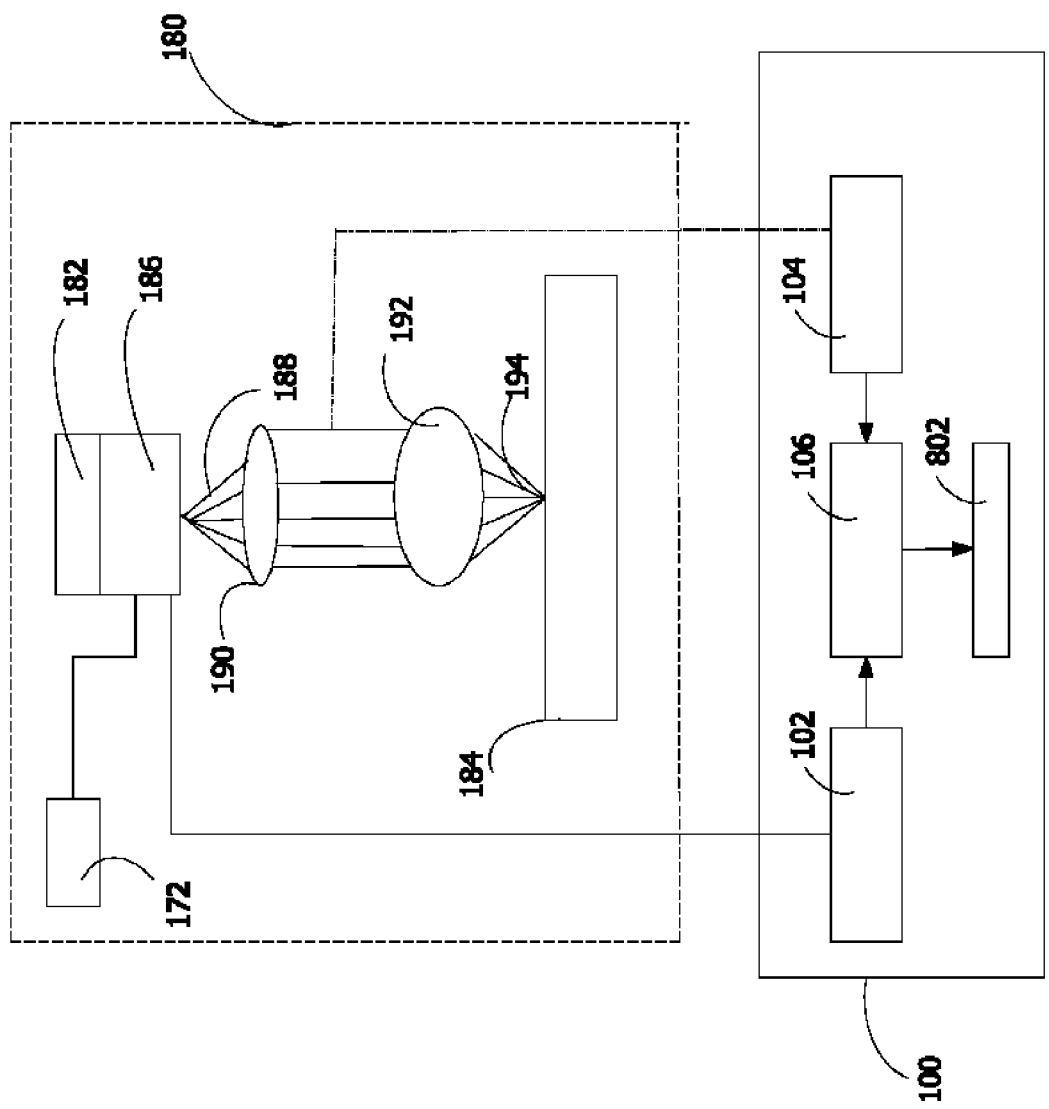

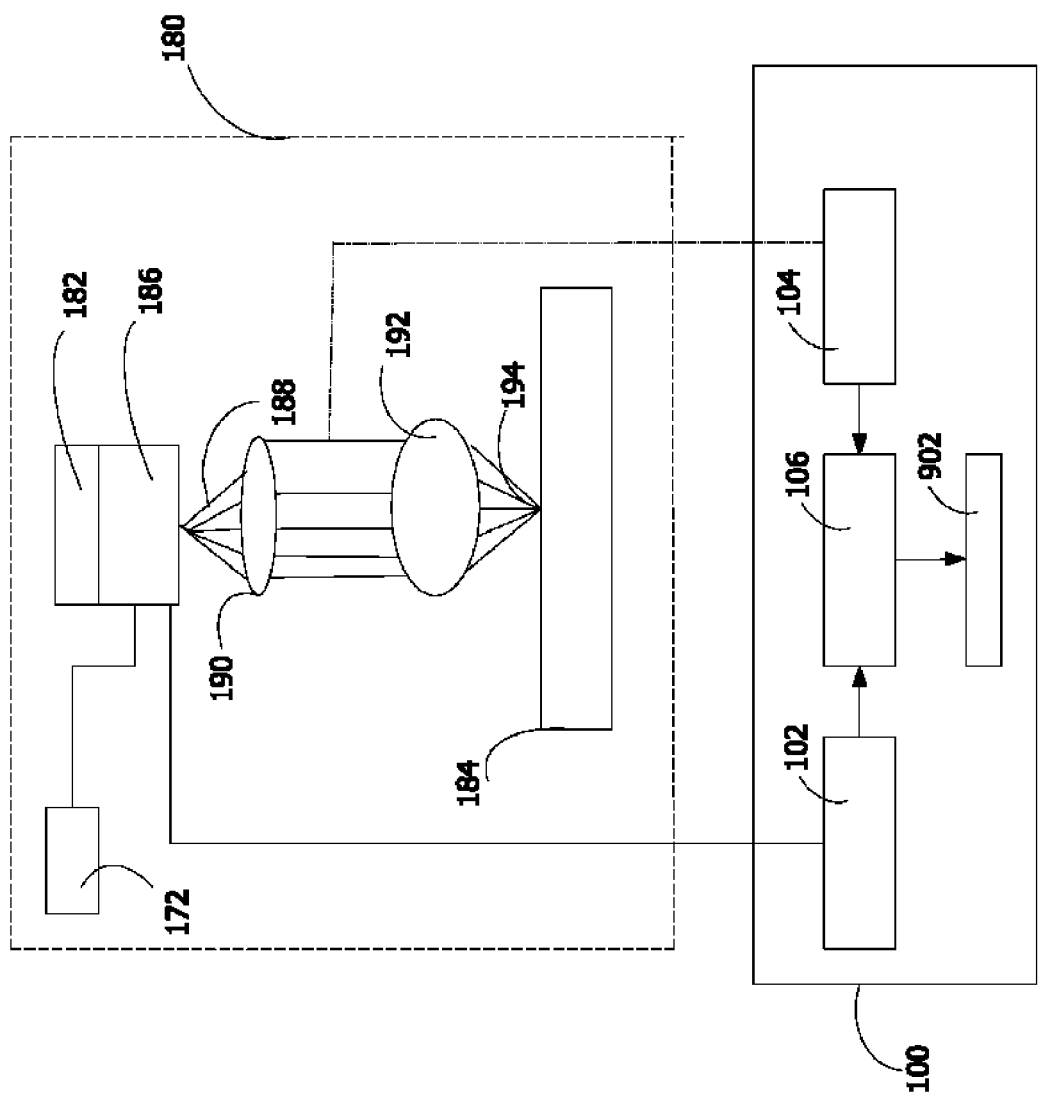

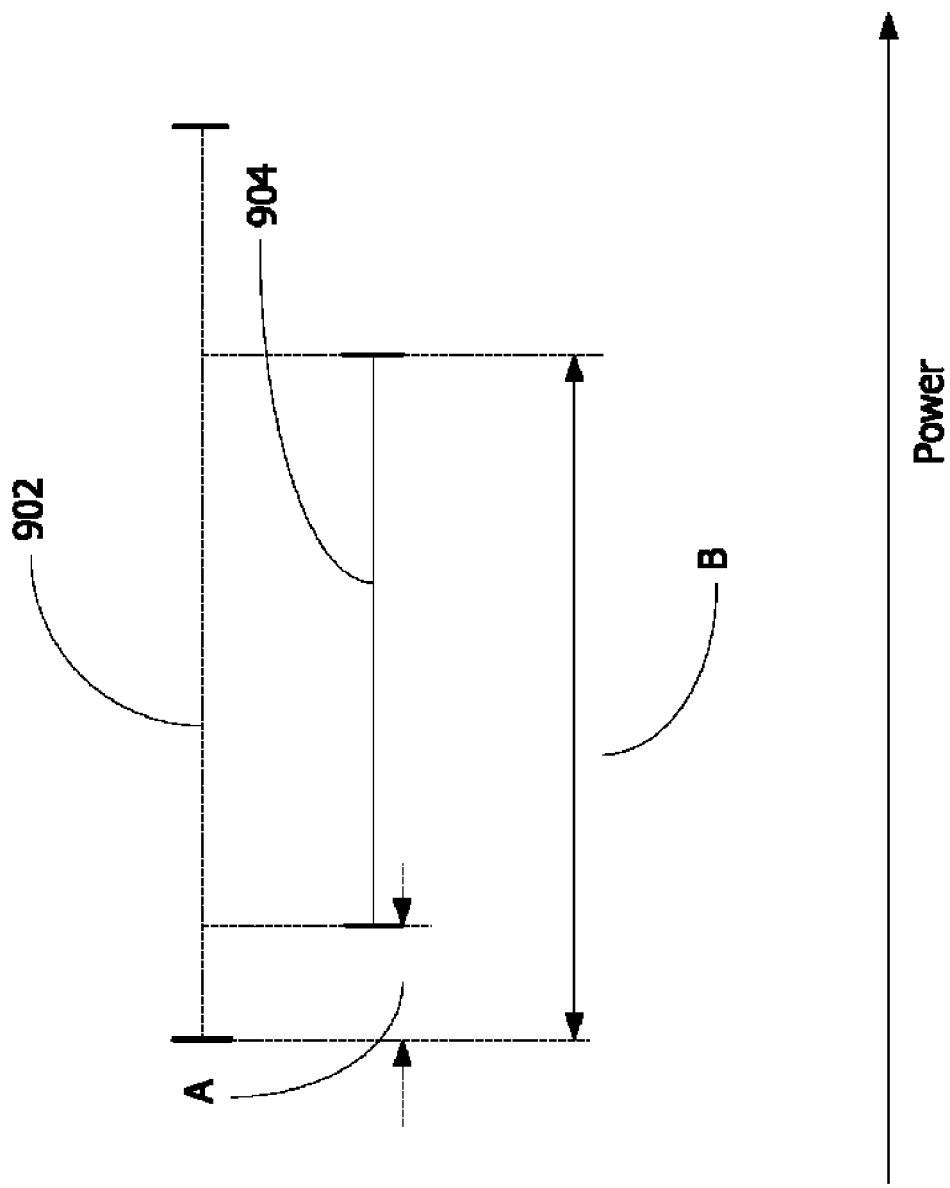

ESTIMATION OF MAXIMUM AVAILABLE WRITE POWER OF AN OPTICAL STORAGE DRIVE

Figure 1:
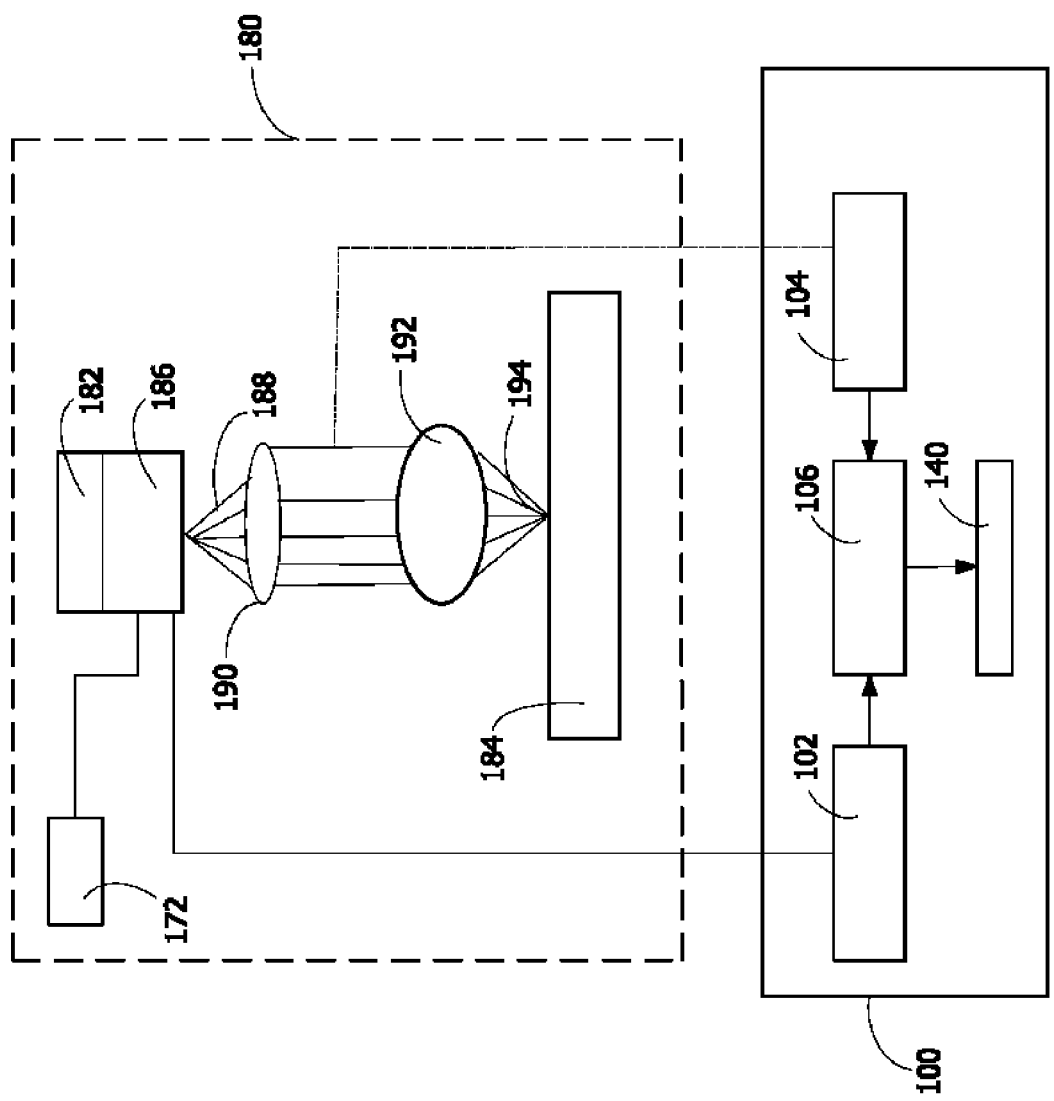

The present invention relates to a method of estimating maximum available write power of an optical storage drive.

The present invention further relates to a system for estimating maximum available write power of an optical storage drive.

The present invention further relates to use of the method of estimating maximum available write power during start up of the optical storage drive.

The present invention further relates to use of the method of estimating maximum available write power during manufacturing of an optical storage drive.

The present invention further relates to an optical storage drive comprising the system for estimating the maximum available write power.

When new optical record medium types that allow higher recording speeds become available in the market, the optical storage drive manufacturers aim at bringing new optical storage drives into the market with a higher laser power to support those new optical record medium types. Most of these optical storage drives aim at supporting all the types of optical record medium available in the market. In principle, all optical storage drives should be able to support all optical record medium types and also the worst case types of optical record medium i.e., the optical record mediums that require the highest laser power. Although the optical storage drive design aims at full support of compliant optical record medium types, it is known that at the highest recording speed not all optical record medium types are supported by the optical storage drives, in case such support requires more laser power than available from the optical storage drive. But, such optical record medium types are still supported at lower recording speeds.

U.S. Pat. No. 5,392,273 discloses an embodiment of a control method for an optical storage drive whereby optimum write conditions can be set even if there is a variation in performance among optical storage drives. The optical storage drive controller has a non-volatile memory that stores a write drive value that provides optimum write performance. This write drive value is measured by writing information to the optical storage medium with a write drive value for the laser light source being varied, and obtaining an optimum write performance value. A control circuit reads out the calibration write power value from the non volatile memory at the time of starting the optical storage drive and controls the drive of said laser light source with the obtained calibration write power value. The procedure only finds out the optimum write power conditions of an optical storage drive making it possible to record data with write power which is most suitable for each individual optical storage drive. The laser power is chosen such that even at the largest emission angles and at the worst-case electrical parameters, the resulting write power in the spot is sufficiently large to support the desired highest recording speed. This means that all optical storage drives have a certain guaranteed maximum power corresponding to the largest emission angles and worst case electrical parameters. But, it is important to note that many optical storage drives could produce more if needed, because they are not the worst case. That is, in this method the extra power that is available from lasers that are not worst case is wasted.

It is an object of the invention to identify optical storage drives with lasers that have favourable parameters to operate the optical storage drive on various optical record media. It is a further object of the invention to maximize the number of optical record medium/optical storage drive pairs that can operate at the highest recording speed. This object is achieved by providing a method of estimating maximum available write power of an optical storage drive comprising the steps of generating a beam of laser light from a laser light source having a power level (P), measuring a first parameter of the laser light source, measuring a second parameter of the beam of the laser light that is generated, using the measured first parameter and the measured second parameter to estimate the maximum available write power of the optical storage drive.

In a first embodiment of the method according to the invention, the method comprises measuring the laser current of the laser light source as the first parameter. This has the advantage that the presently available laser driver integrated circuits (IC's) can be used to carry out the measurement of the laser current.

In a second embodiment of the method according to the invention, the method comprises measuring the electrical power of the laser light source as the first parameter. This has the advantage that the total dissipation in the laser is measured, which provides an accurate measure for the thermal load on the laser.

In a third embodiment of the method according to the invention, the method comprises measuring the temperature of the laser light source as the first parameter. This has the advantage that ageing of the laser and heat dissipation of the laser light source are taken into account while estimating the maximum available write power.

In a further embodiment of the method according to the invention, the method comprises measuring the power level (P) of the beam of laser light as the second parameter. This directly yields the so-called coupling efficiency of the laser into the lightpath.

In a fourth embodiment of the method according to the invention, the estimation of the maximum available write power is carried out by retracting the objective lens before generating the beam of laser light. This has the advantage that damage to the optical record medium is prevented.

In a further embodiment of the method according to the invention, the method comprises storing the estimated maximum available write power in storage means. This has the advantage that the stored estimated maximum available write power can be used to operate the optical storage drive up to its maximum estimated available write power value. This enables the optical storage drive to handle a higher number of optical record media that require power up to the stored maximum available write power value.

In a fifth embodiment of the method according to the invention, the method comprises storing the estimated maximum available write power in an Electrically Erasable Programmable Read Only Memory (EEPROM). Since EEPROM is a non-volatile memory, it can retain data even when it is not receiving power and hence the estimated maximum available write power can be reused for subsequent operation.

In a sixth embodiment of the method according to the invention, the method comprises storing the estimated maximum available write power in a flash memory. Flash memory has the advantages that read and write times are almost instantaneous. It is less noisy and much smaller than traditional memories. Flash memories are highly portable with a much faster access time. Flash memory can erase its data in entire blocks, making it preferable for frequent updating of large amounts of data.

In a seventh embodiment of the method according to the invention, the method comprises storing the estimated maximum available write power in a bar code sticker. The advantage of a bar code sticker is that no EEPROM is required, so that the cost of the optical pick up unit (OPU) is reduced.

In a eighth embodiment of the method according to the invention, the method comprises using the stored estimated maximum available write power to operate the optical storage drive up to the stored estimated maximum available write power. This has the advantage that the maximum available write power of the optical storage drive becomes larger than in the case where no estimation is done.

The object of the invention is further achieved by using the method of estimating the maximum available write power during start up of the optical storage drive. This has the advantage that ageing of the laser and the influence of drive temperature are taken into account while estimating the maximum available write power.

The object of the invention is further achieved by using the method of estimating the maximum available write power during manufacturing of the optical storage drive. This has the advantage that it does not need the system for estimating maximum available write power to be part of the optical storage drive. The system for carrying out the estimation of maximum power can be a separate unit, which can be used for estimating maximum available power of all the optical storage drive that is being manufactured.

The object of the invention is further achieved by providing a system for estimating maximum available maximum available write power of an optical storage drive, the system comprising a first measurement means arranged to measure a first parameter of the laser light source, a second measurement means arranged to measure a second parameter of the beam of laser light, an estimation means arranged to estimate maximum available write power of the optical storage drive using the measured first parameter and the measured second parameter.

In a second embodiment of the system for estimating maximum available write power of an optical storage drive, the system comprises a measurement means arranged to measure laser current of the laser light source as the first parameter.

In a third embodiment of the system for estimating maximum available write power of an optical storage drive, the system comprises a measurement means arranged to measure the electrical power of the laser light source as the first parameter.

In a fourth embodiment of the system for estimating maximum available write power of an optical storage drive, the system comprises a measurement means arranged to measure the temperature of the laser light source as the first parameter.

In a fifth embodiment of the system for estimating maximum available write power of an optical storage drive, the system comprises a measurement means arranged to measure the power level (P) of the beam of laser light as the second parameter.

In a sixth embodiment of the system for estimating maximum available write power of an optical storage drive, the system comprises a means arranged to retract the objective lens before generating the beam of laser light.

In a further embodiment of the system for estimating maximum available write power of an optical storage drive, the system comprises a storage means arranged to store the estimated maximum available write power.

In a seventh embodiment of the system for estimating maximum available write power of an optical storage drive, the system comprises an Electrically Erasable Programmable Read Only Memory for storing the estimated maximum available write power.

In a eighth embodiment of the system for estimating maximum available write power of an optical storage drive, the system comprises a flash memory for storing the estimated maximum available write power.

In a ninth embodiment of the system for estimating maximum available write power of an optical storage drive, the system comprises a bar code sticker for storing the estimated maximum available write power.

The object of the invention is further achieved by providing the optical storage drive with a system for estimating maximum available write power. A Compact disc (CD) drive, a DVD (Digital versatile disc) drive and a Blu Ray drive are a few examples of such optical storage drives that can be provided with a system for estimating maximum available write power.

It is to be noted that the object of the invention is achieved by providing a method and a system for estimating the maximum available write power wherein the system has the same advantages as the methods.

Figure 2:
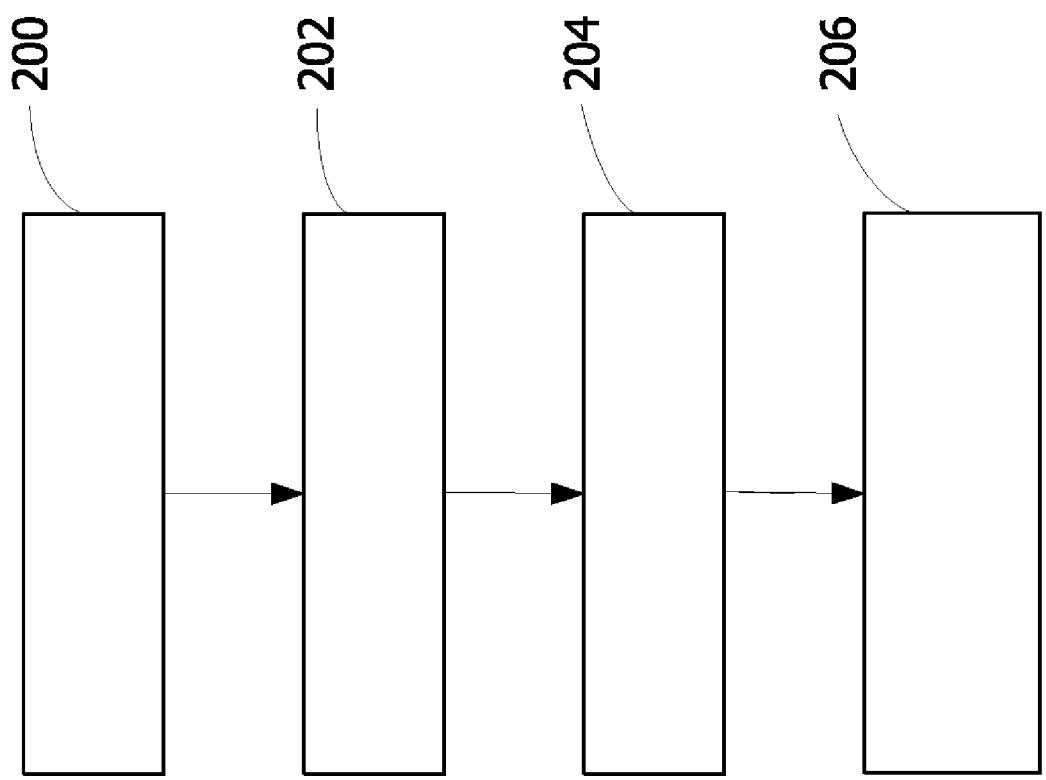
Figure 3:
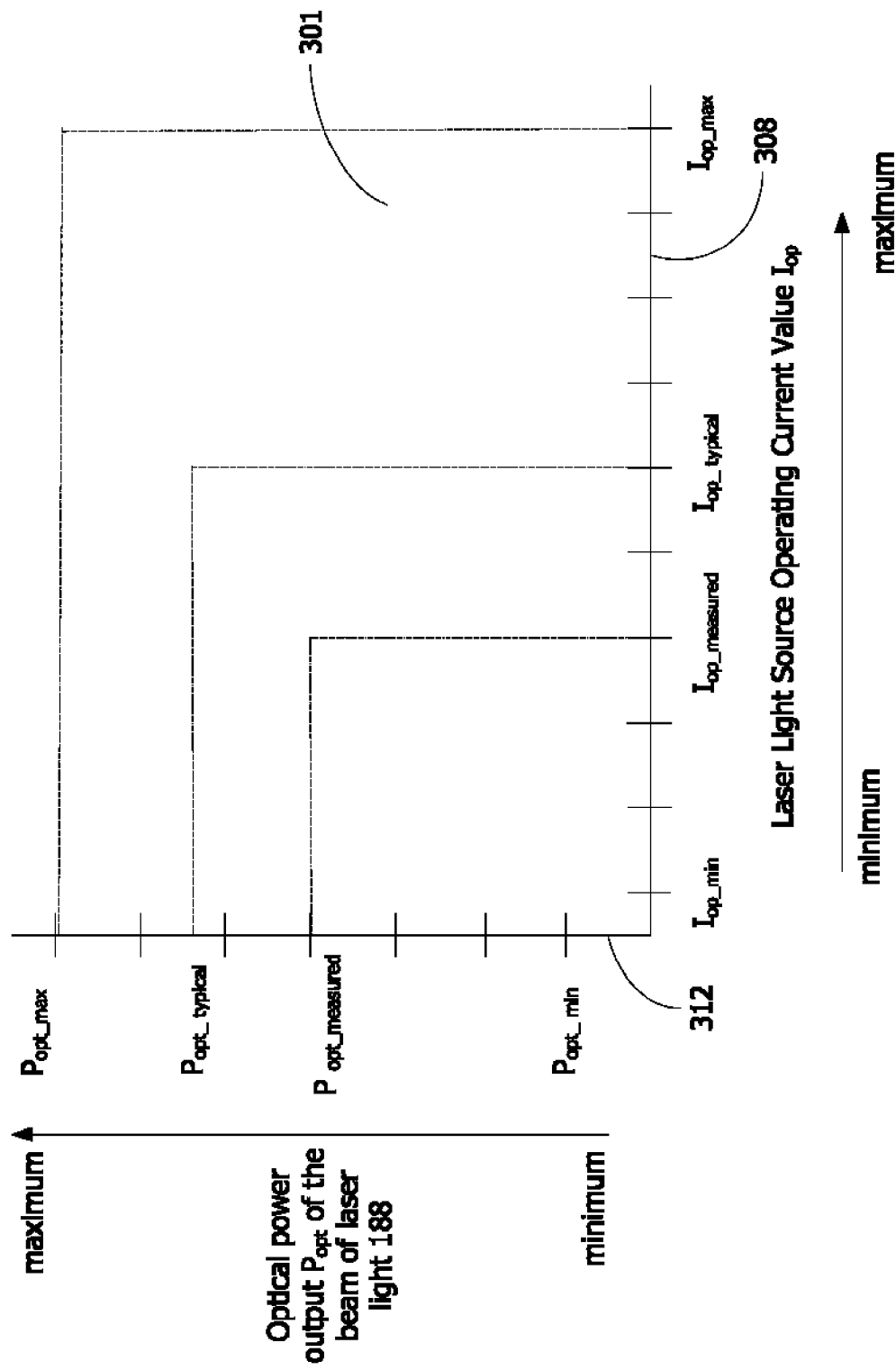
Figure 4:
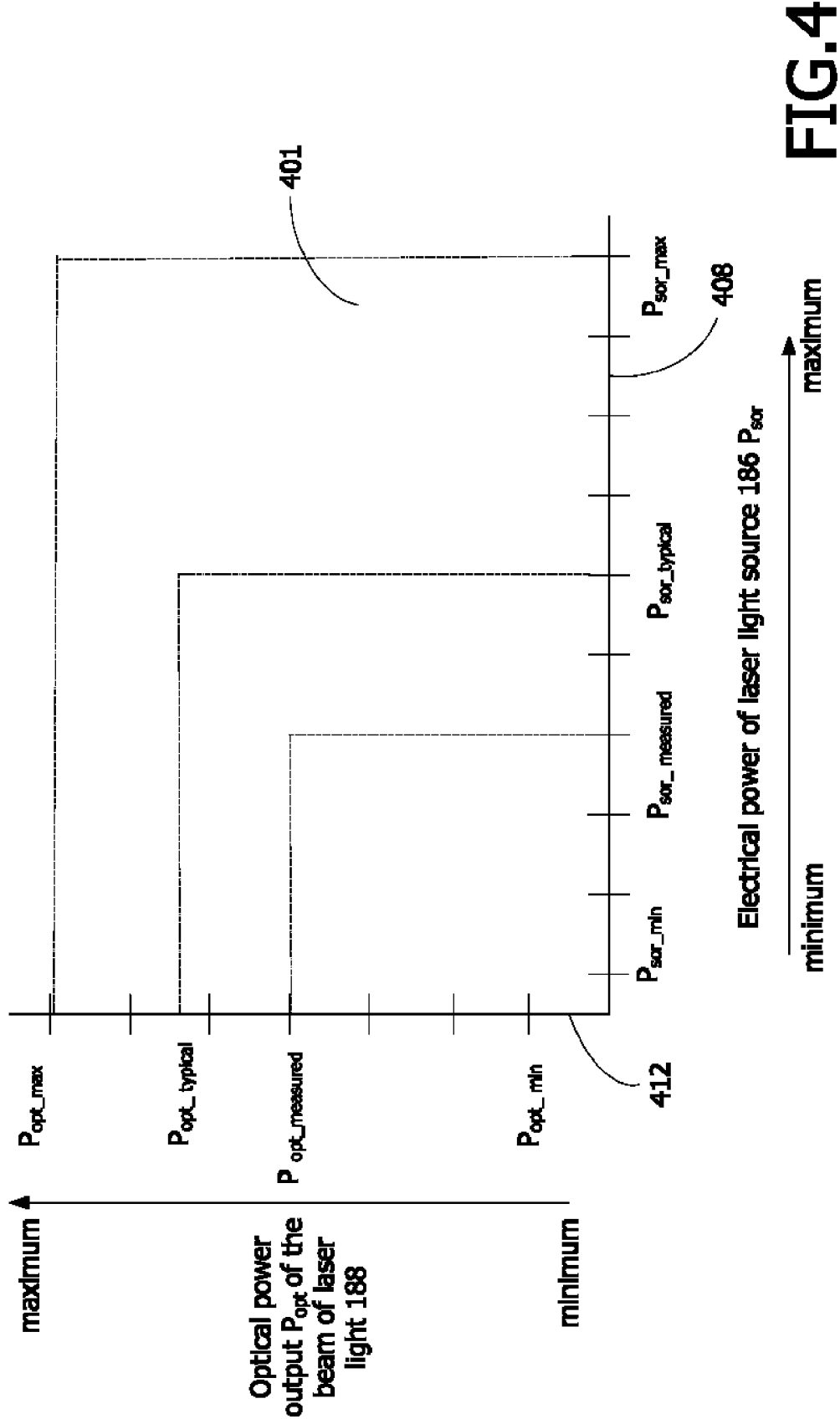
Figure 5:
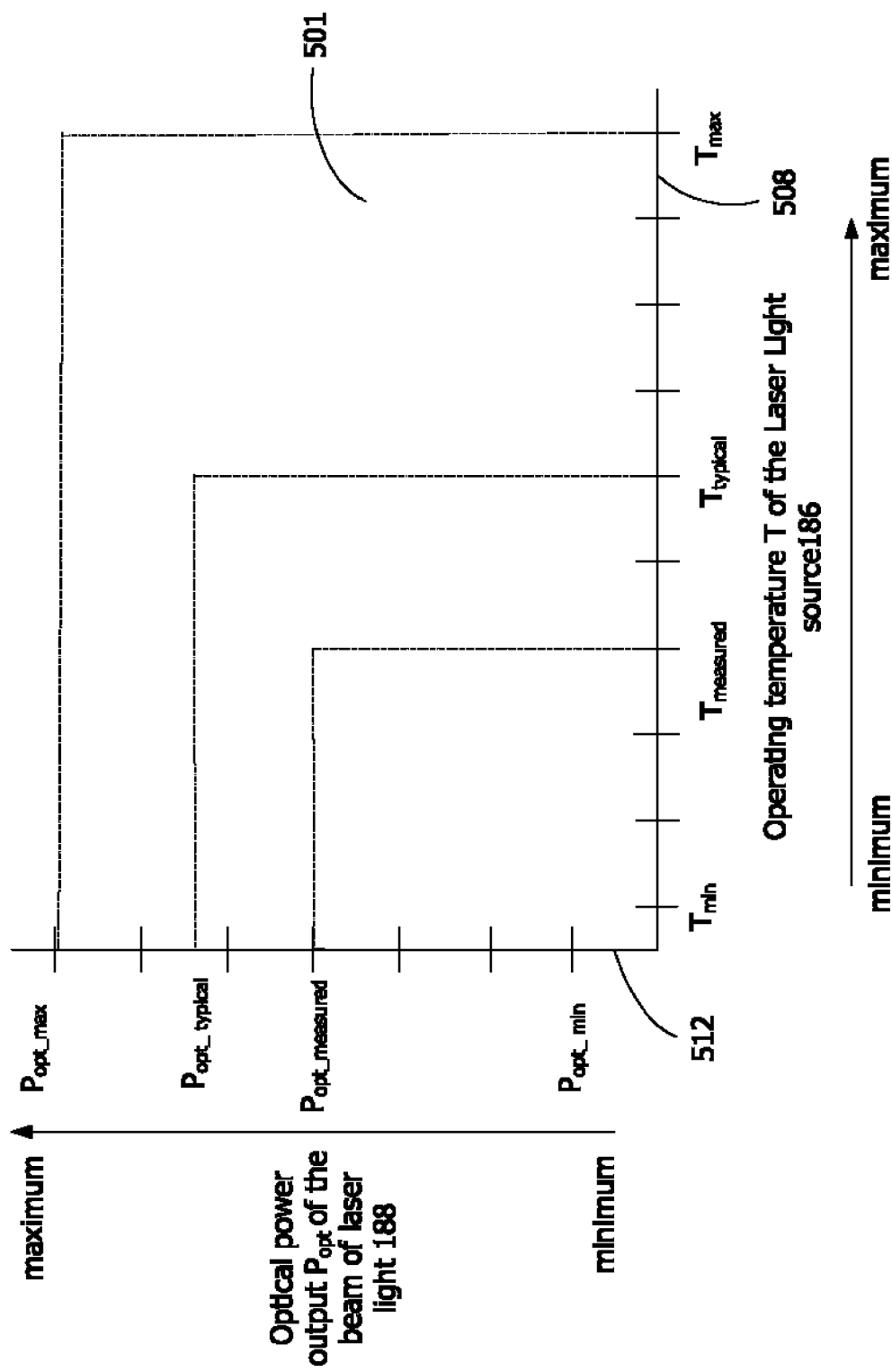
Figure 6:
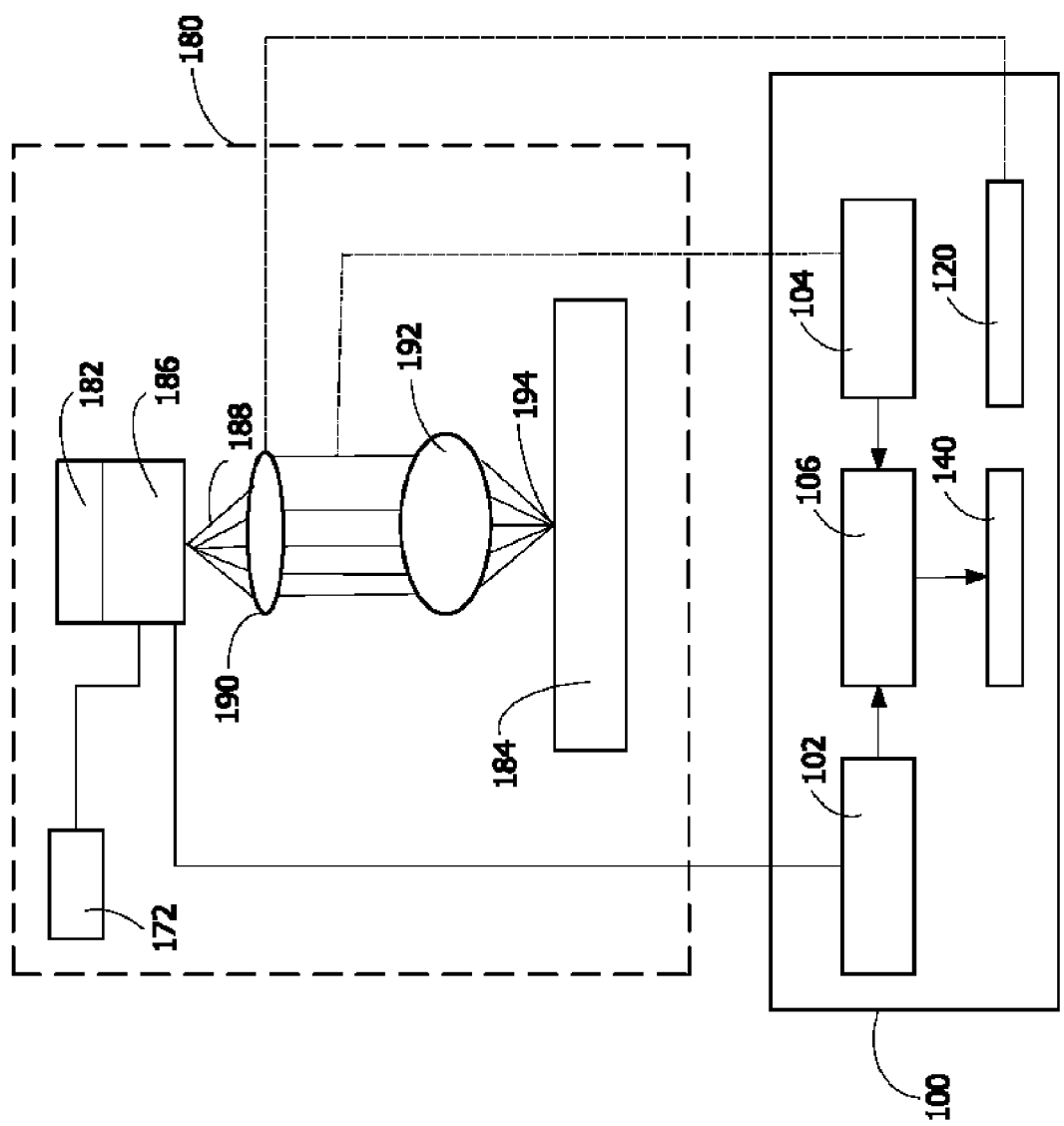
Figure 7:
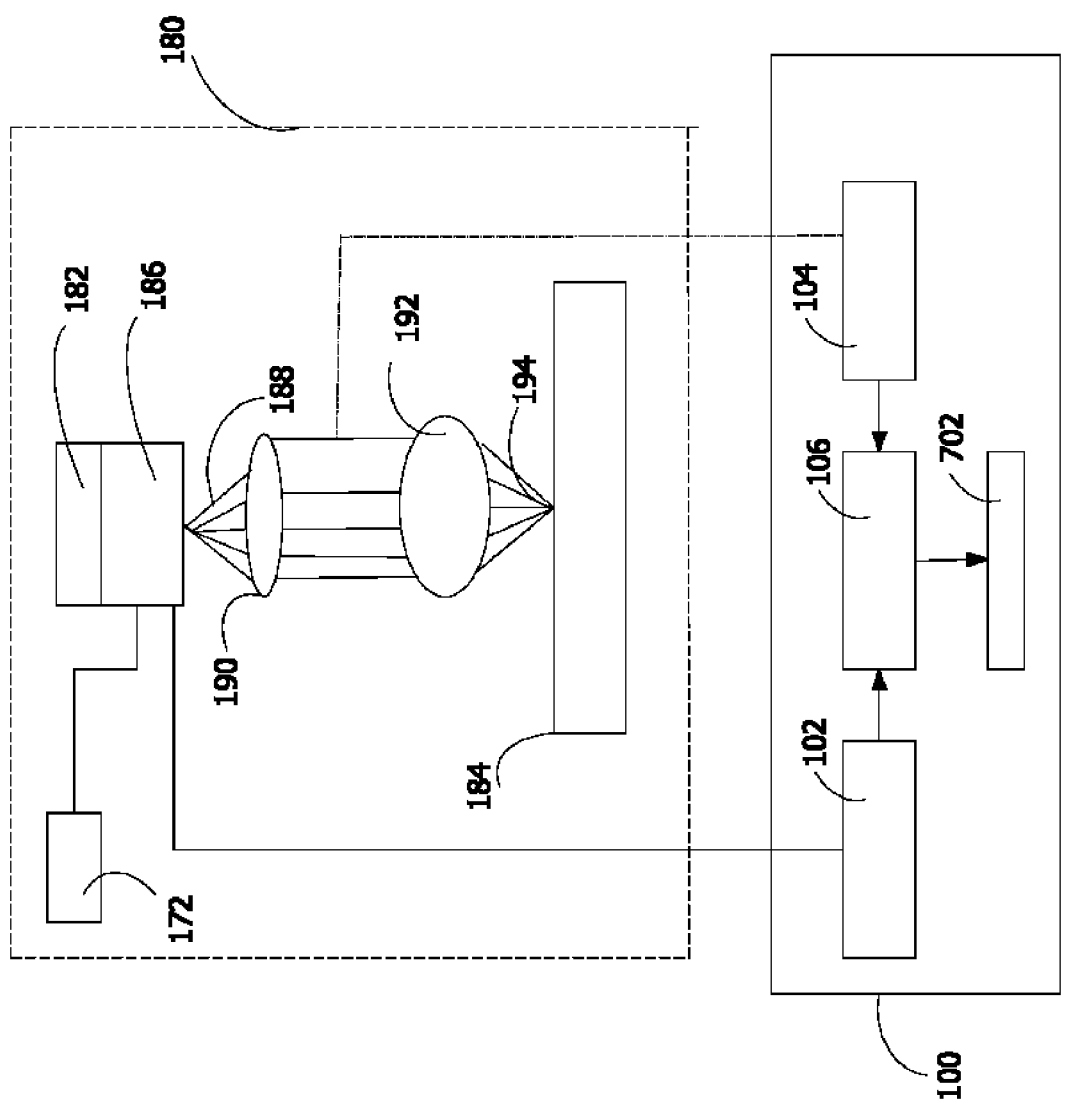

These and other aspects of the invention will be apparent from the embodiments described in the following description and with reference to the accompanying drawings in which, FIG. 1 shows a first embodiment of the system for estimating the maximum available write power of an optical storage drive according to the invention, FIG. 2 shows a simplified flowchart illustrating the method of estimating the maximum available write power according to the invention, FIG. 3 show a first embodiment of the method according to the invention, the method comprising measuring laser current of the laser light source as the first parameter that is needed to produce a certain optical power level of the beam of laser light as the second parameter, FIG. 4 show a second embodiment of the method according to the invention, the method comprising measuring the electrical power of the laser light source as the first parameter that is needed to produce a certain optical power level of the beam of the laser light source as the second parameter, FIG. 5 show a third embodiment of the method according to the invention, the method comprising measuring the temperature of the laser light source as the first parameter that occurs at a certain optical power level of the beam of the laser light as the second parameter, FIG. 6 shows a fourth embodiment of the method and second embodiment of the system according to the invention, wherein the method comprises retracting the objective lens before generating the beam of laser light, FIG. 7 shows a fifth embodiment of the method and third embodiment of the system according to the invention, the method comprising storing the estimated maximum available write power in an Electrically Erasable Programmable Read Only Memory, FIG. 8 shows a sixth embodiment of the method and a fourth embodiment of the system according to the invention, the method comprising storing the estimated maximum available write power in a flash memory, FIG. 9 shows a seventh embodiment of the method and a fifth embodiment of the system according to the invention, the method comprising storing the estimated maximum available write power in a bar code sticker, FIG. 10 illustrates how the present invention allows more optical storage drive/optical record medium pairs to operate at the highest recording speed.

FIG. 1 shows a first embodiment of the system 100 used for estimating the maximum available write power of an optical storage drive 180. The optical storage drive 180 has an optical head 182 for writing data on the tracks of the optical record medium 184. The optical head 182 has a laser light source 186. This laser light source 186 irradiates the optical record medium 184 with a beam of laser light 188 for recording data. This laser light source 186 may be for example an infrared laser diode having a wavelength of 780 nm and an optical power of 5 mW. A laser light source power controller 172 controls the power intensity of the beam of laser light 188 originating from the laser light source 186. The beam of laser light 188 passes through an optical system comprising optical elements such as collimator lens 190 for collimating the beam of laser light 188 and an objective lens 192 for focussing the beam of laser light 188 onto a laser spot 194 on the track of the optical record medium 184. The system 100 for estimating the maximum available write power of the optical storage drive 180 comprises a measurement means 102 to measure a first parameter of the laser light source 186. The system 100 comprises a measurement means 104 to measure a second parameter of the beam of laser light 188. The system 100 further comprises an estimation means 106 arranged to estimate maximum available write power of the optical storage drive 180 using the measured first parameter and the measured second parameter. The system 100 used for estimating the maximum available write power of optical storage drive 180 can be a part of the optical storage drive 180 itself or the system 100 could be a separate unit which can be used for carrying out the estimation of the maximum available write power of the optical storage drive 180. Further, system 100 comprises a storage means 140 arranged to store the estimated maximum available write power. Further, the optical storage drive will have a spindle motor, a spindle processing unit and actuator control to rotate the optical record medium and allow the reading of the tracks of the optical record medium which is implicit and hence not shown in FIG. 1.

FIG. 2 shows a simplified flowchart illustrating the method of estimating the maximum available write power of the optical storage drive 180 (see FIG. 1) according to the invention. The estimation method comprises generating a beam of laser light 188 (see FIG. 1) from the laser light source 186 (see FIG. 1) having a certain power level P in step 200. In step 202, a first parameter of the laser light source 186 (see FIG. 1) is measured using the measurement means 102 of the system 100 (see FIG. 1). In step 204, a second parameter of the beam of laser light 188 (see FIG. 1) is measured using the measurement means 104 of the system 100 (see FIG. 1). In step 206, the maximum available write power of the optical storage drive 180 is estimated using the estimation means 106 (see FIG. 1) of the system 100. The estimation means 106 makes use of the measured first parameter and the measured second parameter to estimate the maximum available write power of the optical storage drive 180.

FIG. 3 show a first embodiment of the method according to the invention, the method comprising measuring laser current of the laser light source 186 as the first parameter that is needed to produce a certain optical power level P of the beam of laser light 188 as the second parameter. In this embodiment, the measurement means 102 (see FIG. 1) measures the laser current of the laser light source 186 as the first parameter. The measurement means 104 (see FIG. 1) measures the optical power level P of the beam of laser light 188. The estimation means 106 (see FIG. 1) estimates the maximum available write power of the optical storage drive 180 using the measured laser current that is needed to produce the optical power level P of the beam of laser light 188. FIG. 3 represents the relationship of the laser current of the laser light source 186 $I_{op\_measured}$ that is measured at a certain optical power level $P_{opt\_measured}$ of the beam of the laser light 188 using the system 100. The operating current value $I_{op}$ of the laser light source 186 increases from a point $I_{op\_min}$ to a point $I_{op\_max}$ along the axis 308. The axis 312 gives an indication of the optical power output of the beam of laser light 188, which varies, from $P_{opt\_min}$ to $P_{opt\_max}$. The operating laser current $I_{op\_measured}$ is measured that is needed to produce a certain optical power $P_{opt\_measured}$ of the beam of laser light 188. The optical power $P_{opt\_measured}$ can be any value that is generated during initial start up of the optical storage drive 180. The laser current $I_{op\_measured}$ is measured using the measurement means 102 of the system 100 that is required to produce this optical power level $P_{opt\_measured}$ of the beam of laser light 188. This optical power level $P_{opt\_measured}$ is measured using the measurement means 104 of the system 100 as shown in FIG. 3. The laser light source 186 has specifications in which the maximum operating laser current of the laser light source 186 is available in a laser diode specification data sheet made available by the laser diode manufacturer. For each laser light source this operating laser current value varies from a minimum operating value to a maximum operating value. Most of the laser light source specifications, specify a typical operating current value $I_{op\_typical}$ which is within the range of minimum and maximum operating value at which the laser light source is guaranteed to give the specified optical output power $P_{opt\_typical}$ of the beam of laser light 188. Most of the optical storage drives use this $P_{opt\_typical}$ as the power. Now, having measured the current $I_{op\_measured}$ that results in an optical power of $P_{opt\_measured}$ of the beam of laser light 188, the maximum available write power of the optical storage drive 180 is estimated by taking the maximum operating current $I_{op\_max}$ that the laser light source 186 can withstand that is available in the laser diode specification data sheet. This estimation carried out by the estimation means 106 of the system 100 is as illustrated below:

For the measured optical power $P_{opt\_measured}$ of the beam of laser light 188, the laser current that is required is $I_{op\_measured}$, therefore, for the available maximum laser current value of $I_{op\_max}$ which is known for the laser light source 186 from the specification data sheet, the maximum available optical write power of the optical storage drive 180 will be, Maximum available optical write power $P_{opt\_max} = (P_{opt\_measured}/I_{op\_measured}) \times I_{op\_max}$ Hence, from the measured laser current $I_{op\_measured}$ of the laser light source 186 that is needed to produce the optical power value $P_{opt\_measured}$ of the beam of laser light 188, the maximum available write power $P_{opt\_max}$ of the optical storage drive 180 is estimated.

Therefore, it can be observed that the optical power of the beam of laser light 188 available from the optical storage drive 180 considered in this embodiment is $P_{opt\_typical}$ which is the power at which the optical storage drive 180 can operate on any optical record medium at a particular recording speed. This optical power $P_{opt\_typical}$ is the guaranteed maximum power, which corresponds to the typical laser current of the laser light source 186 specified in the laser diode specification data sheet. But, it is clear from this embodiment that it is possible to produce more power than $P_{opt\_typical}$ if needed because it is not the worst case. The worst case here refers to the guaranteed optical power, which a laser light source can produce at extreme electrical parameters. Here, in case no estimation of the write power is carried out, the extra power 301 that is ($P_{opt\_max} - P_{opt\_typical}$) would have been wasted and the optical storage drive 180 may not have been used for certain type of optical record mediums that required power in the range of ($P_{opt\_max} - P_{opt\_typical}$). It is clear from the illustration shown in FIG. 3 that the extra power 301 that is available from the laser light source 186 is identified. This extra power 301 can be made use of for recording optical record media that require this power and hence is not wasted. Further, because of this power estimation, the maximum available write power of the optical storage drive 180 becomes larger than in case if no such estimation is done. Here due to the estimation, the maximum power available is $P_{opt\_max}$ rather than $P_{opt\_typical}$. In the case where no estimation is done, the optical storage drive 180 would be used on all optical record media that need a power of $P_{opt\_typical}$. If some optical record media needed more power than $P_{opt\_typical}$, without this estimation method this optical storage drive 180 may not have been used. After performing this estimation, since now it is known that the same optical storage drive 180 can support recording of the optical record media at a power level greater than $P_{opt\_typical}$, the same optical storage drive 180 can be used for handling such optical record media that require higher power than $P_{opt\_typical}$. Hence, the optical record media that could not be handled earlier because they needed more power can now be handled by the same optical storage drive 180 after carrying out the estimation. Additionally, the optical storage drive 180 that has favourable laser parameters to support recording of such optical record media at higher power levels has been identified.

FIG. 4 show a second embodiment of the method according to the invention, the method comprising measuring the electrical power of the laser light source 186 as the first parameter that is needed to produce a certain optical power level P of the beam of laser light 188 as the second parameter. In this embodiment, the measurement means 102 (see FIG. 1) measures the electrical power of the laser light source 186 as the first parameter. The measurement means 104 (see FIG. 1) measures the optical power level P of the beam of laser light 188. The estimation means 106 (see FIG. 1) estimates the maximum available write power of the optical storage drive 180 using the measured electrical power of the laser light source 186 that is needed to produce the power level P of the beam of laser light 188. FIG. 4 represents the relationship of the electrical power of the laser light source 186 $P_{sor\_measured}$ that is measured at a certain optical power level $P_{opt\_measured}$ of the beam of the laser light 188 using the system 100. The electrical power $P_{sor}$ of the laser light source 186 increases from a point $P_{sor\_min}$ to a point $P_{sor\_max}$ along the axis 408. The axis 412 gives an indication of the optical power output of the beam of laser light 188, which varies from $P_{opt\_min}$ to $P_{opt\_max}$. The electrical power of the laser light source 186 $P_{sor\_measured}$ is measured that is needed to produce a certain optical power $P_{opt\_measured}$ of the beam of laser light 188. The optical power $P_{opt\_measured}$ can be any value that is generated during initial start up of the optical storage drive 180. The electrical power $P_{sor\_measured}$ is measured using the measurement means 102 of the system 100. The optical power level $P_{opt\_measured}$ is measured using the measurement means 104 of the system 100. The laser light source 186 has ratings in which the maximum operating power of the laser light source 186 is available in a laser diode specification data sheet made available by the laser diode manufacturer. For each laser light source this operating power of the laser light source varies from a minimum value $P_{sor\_min}$ to a maximum value $P_{sor\_max}$. Most of the laser light source specifications will specify a typical operating power value $P_{sor\_typical}$ which is within the range of minimum $P_{sor\_min}$ and maximum $P_{sor\_max}$ value at which the laser light source 186 gives the specified typical optical power $P_{opt\_typical}$ of the beam of laser light 188. Most of the optical storage drives use this $P_{sor\_typical}$ as the power. This $P_{sor\_typical}$ depends on two parameters namely the operating current and the operating voltage of the laser light source 186. By varying the operating current and the operating voltage value, it is possible to vary the electrical power $P_{sor}$ of the laser light source 186. Now, having measured the power $P_{sor\_measured}$ that results in an optical power of $P_{opt\_measured}$ of the beam of laser light 188, the maximum available write power of the optical storage drive 180 is estimated by taking the maximum operating electrical power of the laser light source $P_{sor\_max}$ that the laser light source 186 can withstand and is available in the laser diode specification data sheet. This estimation carried out by the estimation means 106 of the system 100 is as illustrated below:

For the measured optical power $P_{opt\_measured}$ of the beam of laser light 188, the electrical power of the laser light source 186 that is needed is $P_{sor\_measured}$, therefore, for the available maximum power value of the laser light source 186 $P_{sor\_max}$ which is known for the laser light source 186 from the data sheet, the maximum available write power of the optical storage drive 180 will be, $$\text{Maximum available optical write power } P_{opt\_max} = (P_{opt\_measured}/P_{sor\_measured}) \times P_{sor\_max}$$

Hence, from the measured power $P_{sor\_measured}$ of the laser light source 186 that is needed to produce the optical power value $P_{opt\_measured}$ of the beam of laser light 188, the maximum available write power $P_{opt\_max}$ of the optical storage drive 180 is estimated.

Therefore, it can be observed that the optical power of the beam of laser light 188 available from the optical storage drive 180 considered in this embodiment is $P_{opt\_typical}$ which is the power at which the optical storage drive 180 can operate on any optical record medium at a particular recording speed. This optical power $P_{opt\_typical}$ is the guaranteed maximum power, which corresponds to the typical electrical power of the laser light source 186 specified in laser diode specification data sheet. But, it is clear from this embodiment that is it possible to produce more power than $P_{opt\_typical}$ if needed because this is not the worst case. The worst case here refers to the guaranteed optical power, which a laser light source can produce at extreme electrical parameters. Here, in case no estimation of write power is carried out, the extra power 401 that is ($P_{opt\_max} - P_{opt\_typical}$) would have been wasted and the optical storage drive 180 may not have been used for certain type of optical record media that required power in the range of ($P_{opt\_max} - P_{opt\_typical}$). It is clear from the illustration shown in FIG. 4 that the extra power 401 that is available from the laser light source 186 is identified. This extra power 401 can be made use of for recording optical record media that require more power and hence is not wasted. Further, because of this power estimation, the maximum available write power of the optical storage drive 180 becomes larger than in case if no such estimation is done. Here due to the estimation, the maximum power available is $P_{opt\_max}$ rather than $P_{opt\_typical}$. In the case where no estimation is done, the optical storage drive 180 would be used on all optical record media that needed a power of $P_{opt\_typical}$. If some optical record media needed more power than $P_{opt\_typical}$, without this estimation method, this optical storage drive 180 may not have been used. After performing this estimation, since now it is known that the same optical storage drive 180 can support recording of the optical record media that require higher power than $P_{opt\_typical}$, the same optical storage drive 180 can be used for handling such optical record media that require higher power than $P_{opt\_typical}$. Hence, the optical record media that could not be handled earlier because they needed more power can now be handled by the same optical storage drive 180 after carrying out the estimation. Additionally, the optical storage drive 180 that has favourable laser parameters to support recording of such optical record media at higher power levels has been identified.

FIG. 5 show a third embodiment of the method according to the invention, the method comprising measuring the temperature of the laser light source 186 as the first parameter that occurs at a certain power level P of the beam of the laser light 188 as the second parameter. In this embodiment, the measurement means 102 (see FIG. 1) measures the temperature of the laser light source 186 as the first parameter. The measurement means 104 (see FIG. 1) measures the power level P of the beam of laser light 188. The estimation means 106 (see FIG. 1) estimates the maximum available write power of the optical storage drive 180 using the measured temperature of the laser light source 186 that occurs at a certain power level P of the beam of laser light 188. FIG. 5 represents the relationship of the temperature of the laser light source 186 that is measured at a certain optical power level $P_{opt\_measured}$ of the beam of the laser light 188 using the system 100. The operating temperature of the laser light source 186 increases from a point $T_{min}$ to a point $T_{max}$ along the axis 508. The axis 512 gives an indication of the optical output power $P_{opt}$ of the beam of laser light 188, which varies, from $P_{opt\_min}$ to $P_{opt\_max}$. The operating temperature of the laser light source 186 $T_{measured}$ is measured that is needed to produce a certain optical power $P_{opt\_measured}$ of the beam of laser light 188. The optical power $P_{opt\_measured}$ can be any value that is generated during initial start up of the optical storage drive 180. The maximum write power available from the laser light source 186 is limited by the temperature of the laser. This means that if for a given optical output the heat dissipation in the laser light source varies, the maximum available laser light power will also vary. Specifically, spread on the electrical characteristics of the laser light source, like the threshold current, the differential efficiency and the bias voltage will cause maximum available power to vary. The same applies to the environmental temperature. The temperature $T_{measured}$ is measured using the measurement means 102 of the system 100 that occurs at an optical power level $P_{opt\_measured}$ of the beam of laser light 188. The optical power level $P_{opt\_measured}$ is measured using the measurement means 104 of the system 100. The laser light source 186 has ratings in which the maximum operating temperature of the laser light source 186 is available in a laser diode specification data sheet made available by the laser diode manufacturer. For each laser light source this operating temperature of the laser light source 186 varies from a minimum value $T_{min}$ to a maximum value $T_{max}$. Most of the laser light source 186 specifications will specify a typical operating temperature value $T_{typical}$ which is within the range of minimum and maximum value at which the laser light source 186 gives the specified output optical power $P_{opt\_typical}$ of the beam of laser light 188. Most of the optical storage drives use this $P_{opt\_typical}$ as the power. Now, having measured the temperature $T_{measured}$ that results in an optical power of $P_{opt\_measured}$ of the beam of laser light 188, the maximum available write power is estimated by taking the maximum operating temperature $T_{max}$ that the laser light source 186 can withstand, and that is available in the data sheet. This estimation carried out by the estimation means 106 of the system 100 is as illustrated below:

For the measured optical power $P_{opt\_measured}$ of the beam of laser light 188, the temperature of the laser light source 186 that is needed is $T_{measured}$, therefore, for the available maximum temperature value of $T_{max}$ of the laser light source 186 which is known for the laser light source 186 from the data sheet, the maximum available optical write power of the optical storage drive 180 will be, Maximum available optical write power $P_{opt\_max} = (P_{opt\_measured}/T_{measured}) \times T_{max}$ Hence, from the measured temperature $T_{measured}$ of the laser light source 186, that is needed to produce the optical power value $P_{opt\_measured}$ of the beam of laser light 188, the maximum available write power $P_{opt\_max}$ of the optical storage drive 180 is estimated.

Therefore, it can be observed that the optical power of the beam of laser light 188 available from the optical storage drive 180 considered in this embodiment is $P_{opt\_typical}$ which is the power at which the optical storage drive 180 can operate on any optical record medium at a particular recording speed. This optical power $P_{opt\_typical}$ is the guaranteed maximum power, which corresponds, to the typical operating temperature $T_{typical}$ of the laser light source 186 specified in a laser diode specification data sheet. But, it is clear from this embodiment that it is possible to produce more power than $P_{opt\_typical}$ if needed because this is not the worst case. The worst case here refers to the guaranteed optical power, which a laser light source can produce at extreme electrical parameters. Here, in case no estimation of the write power is carried out, the extra power 501 that is ($P_{opt\_max} - P_{opt\_typical}$) would have been wasted and the optical storage drive 180 may not have been used for certain type of optical record media that required power in the range of ($P_{opt\_max} - P_{opt\_typical}$). It is clear from the illustration shown in FIG. 5 that the extra power 501 that is available from the laser light source 186 is identified. This extra power 501 can be made use of for recording optical record media that require more power and hence is not wasted. Further, because of this power estimation, the maximum available write power of the optical storage drive 180 becomes larger than in case if no such estimation is done. Here, due to the estimation the maximum available power is $P_{opt\_max}$ rather than $P_{opt\_typical}$. In case where no estimation is done, the optical storage drive 180 would be used in all optical record media that need a power of $P_{opt\_typical}$. If some optical record media needed more power than $P_{opt\_typical}$, without this estimation method, this optical storage drive 180 may not have been used. After performing this estimation, since now it is known that the same optical storage drive 180 can support recording of the optical record media at a power level greater than $P_{opt\_typical}$, the same optical storage drive 180 can be used for handling such optical record media that require higher power than $P_{opt\_typical}$. Hence, the optical record media that could not be handled earlier because they needed more power can now be handled by the same optical storage drive 180 after carrying out the estimation. Additionally, the optical storage drive 180 that has favourable laser parameters to support recording of such optical record media at higher power levels has been identified.

FIG. 6 shows a fourth embodiment of the method and a second embodiment of the system that is used to estimate the maximum available write power of the optical storage drive 180. Elements that have the same function or construction as in FIG. 1 are designated by the same reference numerals and are not further described in detail. The system 100 has a retracting means 120 arranged to retract the objective lens 192 before generating the beam of laser light 188. In all the embodiments described in the invention, the estimation of maximum available write power is carried out by retracting the objective lens 192 using the retracting means 120 of the system 100. Retracting the objective lens 192 and generating the beam of laser light 188 prevents the damage that may happen to the optical record medium 184.

In a fifth embodiment of the method of the invention and a third embodiment of the system as shown in FIG. 7, the estimated maximum available write power is stored in a storage means 702. The storage means used to store the estimated maximum available write power is an Electrically Erasable Programmable Read Only Memory 702. The laser power controller 172 makes use of this stored maximum write power value for operating the optical storage drive 180 up to the estimated maximum available write power. Further, since EEPROM is a non volatile memory, the estimated maximum available write power can be retained even when the power is switched off and hence can be used for subsequent operation.

In a sixth embodiment of the method of the invention and a fourth embodiment of the system as shown in FIG. 8, the estimated maximum available write power is stored in a storage means 802. The storage means 802 used to store the estimated maximum available write power is a flash memory. The laser power controller 172 makes use of this stored maximum write power value for operating the optical storage drive 180 up to the estimated maximum available write power. Flash memory has the advantages that read and write times are almost instantaneous. It is less noisy and much smaller than traditional memories. Flash memories are highly portable with a much faster access time. Flash memory can erase its data in entire blocks, making it preferable for frequent updating of large amounts of data.

In a seventh embodiment of the method of the invention and a fifth embodiment of the system as shown in FIG. 9, the estimated maximum available write power is stored in a storage means 902. The storage means 902 used to store the estimated maximum available write power is a bar code sticker. The laser power controller 172 makes use of this stored maximum write power value for operating the optical storage drive up to the estimated maximum available write power. The advantage of a bar code sticker is that no EEPROM is required, so that the cost of the optical pick up unit (OPU) is reduced.

It should be noted that the storage means 702, 802 and 902 used to store the estimated maximum available write power can be arranged within the system 100 for estimating the maximum available write power of the optical storage drive. Alternatively these storage means 702, 802 and 902 can be arranged within the optical storage drive 180 itself.

In a further object of the invention, the method of estimating maximum available write power described in the embodiments is used during start up of the optical storage drive. During initial start up of the optical storage drive 180, the first parameter and the second parameter are measured that is required to produce a certain optical power level $P_{opt\_measured}$ of the beam of laser light 188 as illustrated in the embodiments using the measurement means 102 and 104 of the system 100. From the measurements made, the maximum available write power is estimated using the estimation means 106 of the system 100 as illustrated in FIG. 3, FIG. 4, and FIG. 5. The estimated maximum available write power value is stored in a storage means. The laser light power controller 172 makes use of this stored maximum available write power value for operating the optical storage drive 180 up to the estimated maximum available write power. This embodiment has an advantage that ageing of the laser light source 186 and the influence of the laser drive temperature is taken into account while estimating the maximum available write power. Further, the electrical characteristics of a laser may change or deteriorate with time. This embodiment takes such factors also into account during the estimation.

The object of the invention is further achieved by using the method of estimating maximum available write power described in the embodiments during manufacturing of the optical storage drive. During manufacturing of the optical storage drive 180, the system 100 is used for measuring the first parameter and the second parameter that is required to produce a certain optical power level $P_{opt\_measured}$ of the beam of laser light 188. The first parameter and the second parameter are measured using the measurement means 102 and 104 of the system 100 respectively. From the measurements, the maximum available write power is estimated using the estimation means 106 of the system 100 as described in the embodiments. This estimated maximum available write power is stored in a storage means within the optical storage drive 180. The laser light source power controller 172 makes use of this stored maximum available write power value for operating the optical storage drive up to the estimated maximum available write power. This embodiment has the advantage that the system 100 for estimating maximum available write power of the optical storage drive 180 need not be part of the optical storage drive 180. It can be a separate unit which can be used for estimating the maximum available write power of optical storage drives that are manufactured and the same system 100 can be used for subsequent estimations on a number of optical storage drives.

From the embodiments and the illustrations, it is clear that the present invention allows many more optical storage drive/optical record medium pairs to operate at the highest recording speed. This is illustrated in FIG. 10. In FIG. 10 the upper line represents the range of powers 902 needed by all the optical record media on the market, for a certain recording speed. The lower line represents the range of write powers 904 available from the optical storage drives of a specific type. These optical storage drives have laser light source that has write power that varies from minimum to maximum based on several parameters. The maximum available write power could be a maximum write power that is available at the worst case parameters. Without the estimation of the maximum available write power as claimed in the present invention, only fraction A of all the optical record media can be handled by optical storage drives, because only the worst case maximum power is known and hence available. Using the claimed method of estimating the maximum available write power of optical storage drives, the much larger fraction B can be handled by a subset of the optical storage drives. It depends on the distributions of the powers on the two lines what the actual increase in optical storage drive/optical record medium pairs will be for the claimed method.

The order in the described embodiments of the method for estimating maximum available write power of an optical storage drive 180 is not mandatory, a person skilled in the art may change the order of steps without departing from the concept as intended by the present invention. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The invention can be implemented by means of hardware comprising several distinct elements, and by means of a suitably programmed computer. In the system claims enumerating several means, several of these means can be embodied by one and the same item of computer readable software or hardware. The figures and drawings are accordingly, to be regarded for illustrative purposes than being used in the restrictive sense.

The invention claimed is:

1. A method for estimating maximum available write power of an optical storage drive comprising the acts of:
   obtaining a maximum source parameter of the laser light source that the laser light source can withstand;
   generating a beam of laser light from a laser light source having a power level;
   measuring a source parameter of the laser light source;

measuring a beam parameter of the beam of the laser light;
estimating the maximum available write power of the optical storage drive using the measured source parameter, the measured beam parameter, and the maximum source parameter of the laser light source,
wherein the estimating act estimates the maximum available write power of the optical storage drive Popt_max using the following:

$$Popt\_max = (Popt\_measured/Psor\_measured) \times Psor\_max,$$

where Popt_measured is the beam parameter, Psor_measured is the source parameter, and Psor_max is the maximum source parameter.

2. The method of claim 1, wherein the source parameter comprises a current of the laser light source.

3. The method of claim 1, wherein the source parameter comprises an electrical power of the laser light source.

4. The method of claim 1, wherein the source parameter comprises a temperature of the laser light source.

5. The method of claim 1, wherein the beam parameter comprises the power level of the beam of the laser light.

6. The method of claim 1, further comprising the act of retracting an objective lens before generating the beam of laser light.

7. The method of claim 1, further comprising the act of storing the estimated maximum available write power in storage device.

8. The method of claim 7, wherein the storage device comprises an Electrically Erasable Programmable Read Only Memory.

9. The method of claim 7, wherein the storage device comprises a flash memory.

10. The method of claim 7, wherein the storage device comprises a bar code sticker.

11. The method of claim 7, further comprising the act of using the stored estimated maximum available write power to operate the optical storage drive up to the estimated maximum available write power.

12. The method of claim 1, wherein the method is performed during initial start up of the optical storage drive.

13. The method of claim 1, wherein the method is performed during manufacturing of the optical storage drive.

14. A system for estimating maximum available write power of an optical storage drive comprising an optical head having a laser light source for generating a beam of laser light, the system comprising:
a first measurement device configured to measure a source parameter of the laser light source,
a second measurement device configured to measure a beam parameter of the beam of laser light,
an estimation device configured to estimate the maximum available write power of the optical storage drive using the measured source parameter, the measured beam parameter and a maximum source parameter of the laser light source,
wherein the estimation device is configured to estimate the maximum available write power of the optical storage drive Popt_max using the following:

$$Popt\_max = (Popt\_measured/Psor\_measured) \times Psor\_max,$$

where Popt_measured is the beam parameter, Psor_measured is the source parameter, and Psor_max is the maximum source parameter.

15. The system of claim 14, wherein the source parameter comprises a current of the laser light source.

16. The system of claim 14, wherein the source parameter comprises an electrical power of the laser light source.

17. The system of claim 14, wherein the source parameter comprises a temperature of the laser light source.

18. The system of claim 14, wherein the beam parameter comprises a power level of the beam of the laser light.

19. The system of claim 14, further comprising a retracting device configured to retract an objective lens before generating the beam of laser light.

20. The system of claim 14, further comprising a storage device configured to store the estimated maximum available write power.

21. The system of claim 20, wherein the storage device comprises an Erasable Programmable Read Only Memory.

22. The system of claim 20, wherein the storage device comprises a flash memory.

23. The system of claim 20, wherein the storage device comprises a barcode sticker.

24. An optical storage drive comprising a system for estimating maximum available write power as claimed in claim 14.

25. The method of claim 1, wherein the obtaining act obtains the maximum source parameter of the laser light source from a specification data sheet of the laser light source made available by a manufacturer of the laser light source.

26. The system of claim 14, wherein the maximum source parameter of the laser light source is obtaining from a specification data sheet of the laser light source made available by a manufacturer of the laser light source.

* * * * *